FREQUENCY MODULATION MEANS INCLUDING PULSE POSITION MODULATION

Filed Feb. 20, 1956 2 Sheets-Sheet 1

INVENTOR.
HOWARD D. HERN
BY Moody and Goldman
ATTORNEYS

FREQUENCY MODULATION MEANS INCLUDING PULSE POSITION MODULATION

Filed Feb. 20, 1956 2 Sheets-Sheet 2

INVENTOR.
HOWARD D. HERN
BY Moody And Goldman
ATTORNEYS

United States Patent Office 2,870,412

Patented Jan. 20, 1959

2,870,412

FREQUENCY MODULATION MEANS INCLUDING PULSE POSITION MODULATION

Howard D. Hern, Cedar Rapids, Iowa, assignor to Collins Radio Company, Cedar Rapids, Iowa, a corporation of Iowa Application February 20, 1956, Serial No. 566,545

4 Claims. (Cl. 332—16)

This invention relates to a modulation circuit which obtains angular modulation by first obtaining pulse-spacing modulation in response to an amplitude-varying modulating signal.

This invention provides a novel means for obtaining pulse-spacing modulation and uses it with a ringing means to vary the phase of a carrier signal in response to an amplitude-varying modulating signal. However, the input modulation can easily be controlled to obtain at the output of the invention any type of angular modulation such as frequency modulation, phase modulation, or a combination of both. Well known preemphasis networks may be used with an initial amplitude varying modulating signal for this purpose. For example, a frequency-modulated output may be obtained by varying the amplitude of the initial modulation inversely to its component frequencies. Without any preemphasis, the output of the invention may be a pure phase-modulated signal.

The invention can provide extreme linearity between the amplitude of its input signal and the phase variation of its output signal.

It is, therefore, an object of this invention to provide an extremely linear phase-modulating circuit of relatively simple and economical construction.

This invention can utilize the most linear portion of a saw-tooth wave, that may be generated by conventional means; and it adjustably can choose the central operating point in this most linear portion.

The saw-tooth wave is injected through a diode to a given point on the voltage divider, and the modulating signal is injected on the voltage divider to vary the voltage at the given point with the amplitude of the modulating signal. Each saw-tooth cycle is terminated during its linear portion by conduction of the diode when the saw-tooth voltage exceeds the modulating voltage at the given point on the divider, and a pulse is generated at this instant.

Due to the linearity of the utilized saw-tooth voltage, the time of diode closing will vary in direct proportion to the instantaneous amplitude of the input modulating signal causing the discharge. Thus, time-spacing modulation occurs between the generated pulses.

The leading edge of each pulse is used to actuate a ringing circuit, which is tuned either to the fundamental frequency of the saw-tooth wave or to any of its harmonic frequencies. Where the ringing circuit has a low Q for broad bandpass, amplification and pulse sharpening are necessary to provide a proper output from the ringing circuit. A substantially constant-amplitude output of the ringing circuit is filtered to provide a wave that smoothly varies phase-wise with the input modulating signal.

Further objects, features and advantages of this invention will be apparent to a person skilled in the art upon further study of the specification and drawings, in which.

Figure 1:
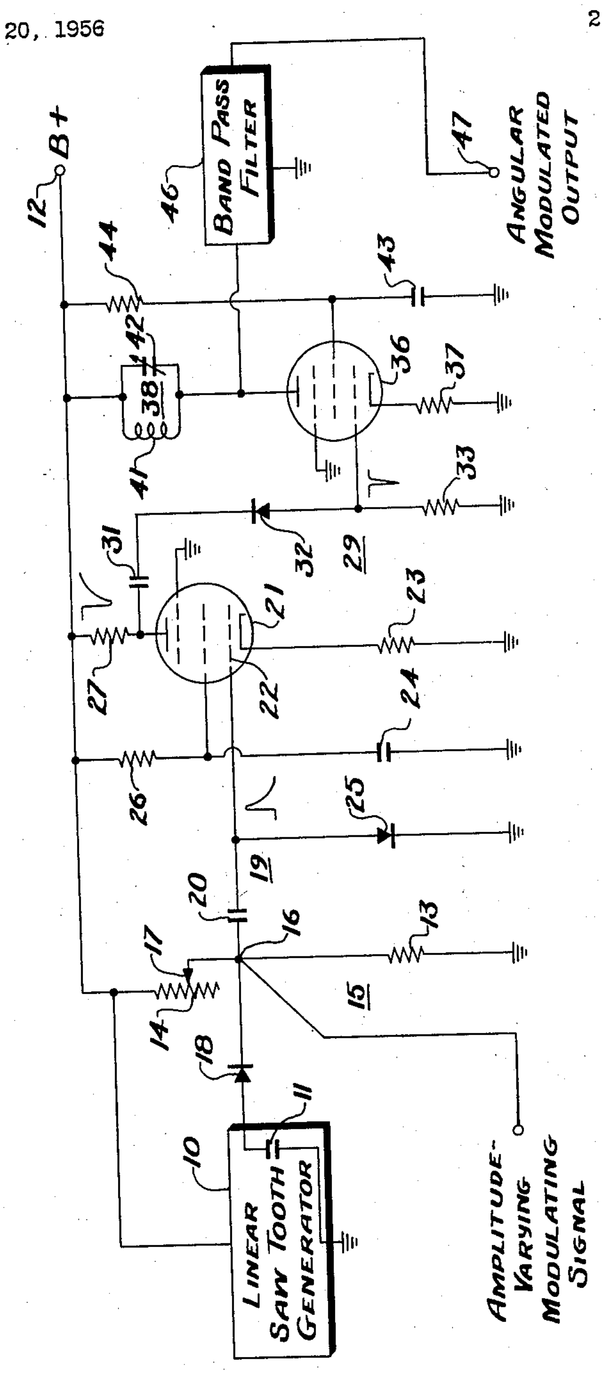
Figure 1 illustrates one embodiment of the invention.

Now referring to the invention in more detail, Figure 1 includes a linear saw-tooth generator 10, which might be a conventional type known as a "boot-strap" saw-tooth generator. It has a charging capacitor 11, that has one side connected to ground; and capacitor 11 receives, in this embodiment, a positive charge on its other side during the increasing portion of each saw-tooth cycle. A B-plus source connects at terminal 12 to one side of saw-tooth generator 10.

A voltage divider 15, consisting of a resistor 13 and a variable rheostat 14, is connected between ground and the B-plus source. Accordingly, the direct voltage at a given intermediate point 16, is adjustable by varying tap 17 of the rheostat.

A first diode 18 is connected on its anode side to charging capacitor 11 and on its cathode side to point 16.

A first differentiating network 19 has a capacitor 20 and a diode 25 connected in series between intermediate divider point 16 and ground. The polarity of the diode connection is determined by the polarity of the saw-tooth wave and here the cathode of diode 25 is connected to ground.

A first amplifying tube 21, which is a pentode in Figure 1, has its control grid 22 connected to the anode of diode 25. A cathode resistor 23 is connected between ground and the cathode of pentode 21; while its screen grid is conventionally connected to ground through a capacitor 24 and to the B-plus source through a resistor 26. The suppressor grid is connected to ground. A plate resistor 27 is connected between the plate or pentode 21 and the B-plus source.

A second differentiating network 29 is connected between the plate of pentode 21 and ground. Network 29 includes a capacitor 31, a diode 32 and a resistor 33 connected in series. The connected polarity of diode 32 depends on the polarity of the output pulses of amplifier tube 21, and here diode 32 has its anode connected to resistor 33.

A second amplifying tube 36, which is a pentode, has its control grid connected to the ungrounded side of resistor 33; and a cathode resistor 37 is connected between ground and the cathode of pentode 36.

A ringing circuit 38, which is parallel resonant at either the fundamental or any harmonic frequency of the saw-tooth repetition rate, is connected between the plate of second pentode 36 and the B-plus source. Ringing circuit 38 comprises an inductor 41 and a capacitor 42 connected in parallel; and either or both may be tunable. The screen grid and the suppressor grid of pentode 36 are conventionally connected. Its suppressor grid is connected to ground; a capacitor 43 is connected between the screen grid and ground; and this screen grid is connected to the B-plus source through a resistor 44.

A bandpass filter 46 is connected to the plate of second pentode 36 to receive the output of ringing circuit 38. Filter 46 is tuned to the same frequency as ringing circuit 38, which may be the fundamental or any harmonic of the saw-tooth repetition rate. Filter 46 has a bandpass sufficient to include all desired modulation components of the modulated output signal, which directly varies in phase with the variation in amplitude of the modulating signal provided at intermediate-divider point 16.

However, the output signal at an output terminal 47 may have any type of angular modulation with respect to an initial source of modulation. This can easily be done with a frequency-correction network (not shown) of conventional design which may be connected between the initial modulation source and divider point 16. For example, when the correction network (or preemphasis network) varies the amplitude of the initial modulating signal inversely proportional to its frequency, a frequency-modulated relationship is provided between the initial modulating signal and the output of the invention at terminal 47. Furthermore, the frequency response of the correction network may be easily controlled to provide a combination of frequency and phase modulation between the initial modulating signal and the output of the invention in order to obtain an optimum signal-to-noise ratio for the modulated signal during its transmission.

Figures 2, 3, 4, 5, 6:
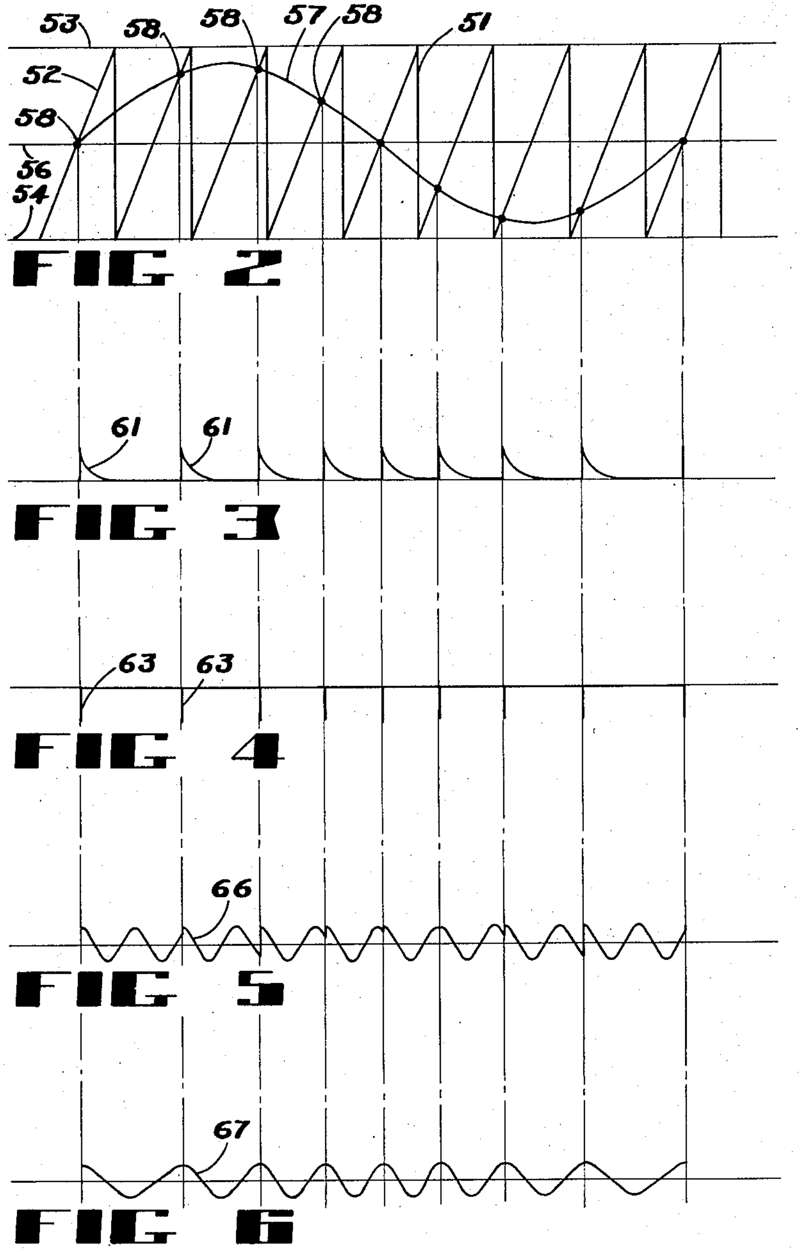
Figures 2, 3, 4, 5 and 6 illustrate various waveforms occurring at various points in the illustrated embodiment.

In operation, saw-tooth generator 10 provides an output wave, such as wave 51 in Figure 2. Each saw-tooth cycle has a rising portion 52 that is linear. If the rising portions of an input saw-tooth wave have only small parts that are linear, this invention can easily be made to use only those linear parts. The saw-tooth wave will have maximum and minimum voltage levels that bound its linear rising portions, and they are designated as levels 53 and 54, respectively, in Figure 2.

Voltage divider 15 is adjusted by means of rheostat 14 so that the voltage at point 16 is centered in the most linear part of the saw-tooth rising portion, which in Figure 2 is presumed to be midway between upper and lower levels 53 and 54 and is identified by level 56. Accordingly, the cathode of diode 18 is biased by the voltage at point 16.

If a single saw-tooth cycle is considered, it will be noted that linear wave portion 52 occurs across capacitor 11 as a positive voltage that increases from level 54 and determines the voltage on the anode of diode 18. When the voltage across capacitor 11 rises to the voltage at intermediate divider point 16, diode 18 begins conduction at that instant, and the voltage at point 16 increases momentarily to a more positive level due to an increase in current flow through resistor 13 caused by the additional circuit through diode 18. Normally, differentiating capacitor 20 is charged to the voltage across divider resistor 13. The sudden increase in voltage at point 16 tends to increase the potential on capacitor 20 in a positive direction; and a momentary current rushes through diode 25 to create across it a voltage pulse that is received by the control grid of tube 21.

The above described sequence occurs when no modulating signal current is provided at divider point 16. When the modulating signal is provided, the voltage at point 16 varies with the modulating signal about an average value 56, in Figure 2, set by the voltage divider. Thus, in Figure 2, wave 57 is illustrative of a modulating voltage wave.

As the voltage at divider point 16 varies with the modulation, the cathode bias of diode 18 varies accordingly. Thus, the discharge or clipping points for the saw-tooth wave vary in the same manner and occur at points 58 in Figure 2.

The pulses, generated at the input to amplifier 21, occur at these points and are shown in Figure 3 as pulses 61. The time-spacing between pulses 61 varies with modulating signal 57, and has a time-lag and smoothness that varies with the number of saw-tooth cycles that occur during a cycle of modulation. Generally, at least six saw-tooth pulses should occur during each cycle of modulating signal.

Linearity is obtained between the amplitude of the input and the variation of spacing of the pulses by maintaining the saw-tooth wave linear in its time variation along that portion where discharging points 58 occur.

The flyback of the saw-tooth wave creates another sudden change of voltage at point 16 in the opposite direction to open diode 18. This change causes differentiating capacitor 20 to bias the plate of differentiating diode 25 in a negative manner and no current flows through it. Therefore, it does not create a negative pulse at the input to amplifier tube 21.

The positive pulse provided across diode 25 appears at the plate of first pentode 21 with an inverted polarity and causes a sudden drop in voltage at the plate of tube 21. Only the sharp leading edge of this pulse is used to generate a very sharp pulse at the input of the following pentode 36. The sharp leading edge maintains a negative bias on differentiating diode 32 and conduction then occurs through it and resistor 33 to maintain the adjacent plate of capacitor 31 at substantially ground potential during the leading edge of the pulse. However, when the trailing edge of the pulse begins at the plate of pentode 21, a positive bias is provided on the cathode of diode 32, and it is cut off to prevent current flow through resistor 33. Thus, only the leading edge of each pulse causes current flow through resistor 33, and, therefore, only the leading edge creates a voltage pulse on the control grid of second pentode 36. Hence, the trailing edges of pulses 61 have no effect.

The pulses provided at control grid of second pentode 36 are shown as pulses 63 in Figure 4, and have negative polarity. They are amplified and inverted to positive polarity at the plate of pentode 36, where they shock excite ringing circuit 38.

Figure 5 illustrates, in an exaggerated manner, how the pulses provided to the ringing circuit shock excite it and advance or retard the phase of its ringing voltage. Each pulse brings the ringing circuit to a maximum amplitude and begins a new cycle. Thus, a phase difference occurs due to the varying time-spacing of the pulses. The discontinuities in wave 66 in Figure 5, caused by the shock excitation, are filtered out by filter 46, which receives the ringing circuit output to provide a smoothly varying output.

Consequently, a smoothly varying carrier signal 67, shown in Figure 6, is provided at output terminal 47 and varies in phase with the modulation received at divider point 16.

It will generally be found, due to imperfections in saw-tooth wave generation, that only a relatively small portion of each saw-tooth cycle will be extremely linear; such as, for example, a ten percent portion. The invention can easily be made to operate in this portion by adjusting the rheostat 14 to obtain at point 16, a voltage that is at the midpoint of this saw-tooth portion. The modulation voltage provided at point 16 is, therefore, adjusted so that modulation peaks cause a swing within the linear saw-tooth portions.

Furthermore, diode variation will often be found, wherein different diodes, used as diode 18, will begin conduction at slightly different bias voltages. This situation can easily be compensated in the invention by adjusting tap 17 on rheostat 14 to compensate for the diode variation. As a result, the midpoint of the most linear saw-tooth region can be most fully utilized by this invention.

The amplifiers 21 and 36 as well as pulse-sharpening circuit 29 are needed to drive ringing circuit 38 when it has a very low Q; which is needed when the modulated signal has a very large spectrum, as may be required for multiplexing.

However, when only a narrow bandpass modulated output is required, ringing circuit 38 may be a high Q circuit (and may even be a mechanical resonator). Then, the ringing circuit may be directly actuated (without amplification) by the pulsed output of diode 25 in first differentiating circuit 19, thereby eliminating the necessity for amplifiers 21 and 36 and pulse-sharpening network 29.

It is, therefore, apparent that this invention provides angular modulation means which can maintain extreme linearity between the modulation angle of a carrier signal and the amplitude of an input modulation. Generally, the saw-tooth generator will be crystal controlled in order to provide the output carrier signal with a stable center frequency.

While a particular form of the invention has been shown and described, it is to be understood that the invention is capable of many modifications. For example, it is possible to substitute a resistor for second diode 25. Then, an undesirable negative pulse will occur on the control grid of first pentode 21 due to the saw-tooth flyback. However, this undesirable pulse will be substantially blocked to second pentode 36 by diode 32. Changes, therefore, in construction and arrangement may be made without departing from the full scope of the invention as given by the appended claims.

I claim:

1. Means for phase modulating a carrier signal by means of an amplitude-varying modulating signal, comprising a saw-tooth generator, a resistive voltage divider, a source of direct voltage connected across said voltage divider, an asymmetric conductor connected between said saw-tooth generator and an intermediate point on said voltage divider, said amplitude-varying modulating signal connected to said intermediate point, a differentiating circuit comprising a capacitor and a second asymmetric conductor connected in series across a portion of said divider, with said capacitor connected to said intermediate point and said second asymmetric conductor connected to another point on said divider, said first and second asymmetric conductors having their conduction states abruptly changed when the saw-tooth wave applied to one side of said first asymmetric conductor substantially equals the instantaneous potential at said intermediate point, said differentiating network thereby forming a pulse at the instant that its asymmetric conductor changes its conduction state, and a parallel-resonant circuit tuned to a multiple of said saw-tooth repetition rate operably connected to receive the pulses generated by said differentiating network, whereby the output of said ringing circuit is a phase-modulated carrier signal.

2. Means for generating pulses with a time spacing that varies in response to an amplitude-varying modulating signal, comprising a saw-tooth generator providing an output saw-tooth wave having a given polarity, said wave having at least a portion that is linear, a direct-voltage source having the same polarity as said saw-tooth wave, a resistive voltage divider connected across said voltage source, a first diode connected between the output of said saw-tooth generator and an intermediate point on said voltage divider, the direct voltage at said intermediate point substantially equaling the central voltage of the linear portion of said saw-tooth wave, said first diode connected with a polarity that maintains said diode in a non-conducting state until said saw-tooth wave substantially equals the voltage at said intermediate point, said modulating signal connected to said intermediate point to correspondingly vary the voltage at that point, a differentiating circuit comprising a capacitor and a second diode connected in series, said capacitor connected to said intermediate point and said second diode connected to ground, said second diode connected with a polarity which provides pulses across said diode having the same polarity as said voltage source, amplifying and pulse sharpening means connected across said second diode to amplify and sharpen its output pulses.

3. Angular-modulation means comprising a saw-tooth generator for providing a saw-tooth wave with positive polarity, a B-plus direct-voltage source connected to said saw-tooth generator, a resistive voltage divider including a rheostat, said voltage divider connected between said B-plus source and ground, a first diode having its anode connected to the output of said saw-tooth generator and its cathode connected to an intermediate point on said voltage divider, a first differentiating circuit comprising a capacitor and a resistive means connected respectively in series between said intermediate point and ground, first amplifying means having its input connected across the resistive means in said first differentiating circuit, a second differentiating circuit including a second capacitor, a third diode and a resistor connected respectively in series between the output of said first amplifying means and ground, said third diode connected with a polarity wherein it is rendered conductive by the leading edge of a pulse received from the output of said first amplifying means, second amplifying means connected across the resistor of said second differentiating circuit, a parallel-resonant circuit tuned to a multiple of the repetition rate of said saw-tooth wave, said parallel-resonant circuit connected to the output of said second amplifying means, and a bandpass filter tuned to the same frequency as said parallel-resonant circuit connected to said parallel-resonant circuit, whereby the output of said bandpass filter provides a carrier signal that is angularly modulated in response to the input amplitude-varying modulating signal.

4. Angular modulation means comprising saw-tooth generating means for providing a saw-tooth wave of positive polarity, a positive direct-voltage source connected operably to said generating means, a voltage divider connected between said direct-voltage source and ground, said divider including adjustable resistance means, a first diode having its cathode connected to an intermediate point on said voltage divider and its anode connected to the output of said saw-tooth generator, an amplitude-varying modulating source connected to said intermediate point, a first capacitor connected on one side to said intermediate point, a second diode having its anode connected to the opposite side of said capacitor and its cathode connected to ground, a first amplifier means having its input connected across said second diode, a pulse-sharpening network serially connected to the output of said first amplifier means, with said network respectively comprising a second capacitor, a third diode and a resistor connected in series, said third diode made conducting by the leading edges of pulses provided at the output of said first amplifier means, a second amplifier means with its input connected across said third resistor, and a ringing circuit connected to the output of said second amplifier means, said ringing circuit tuned to a multiple of the repetition rate of said saw-tooth wave, a bandpass filter tuned to the same frequency as said ringing circuit and connected across said ringing circuit, whereby the output of said bandpass filter is angular-modulated in response to the output of said amplitude-varying modulating source.

References Cited in the file of this patent

UNITED STATES PATENTS

| | | |
|---|---|---|
| 2,490,026 | Buckbee | Dec. 6, 1949 |
| 2,523,279 | Chatterjea | Sept. 26, 1950 |
| 2,566,826 | Day | Sept. 4, 1951 |